US011967448B2

(12) United States Patent
Lee

(10) Patent No.: US 11,967,448 B2
(45) Date of Patent: Apr. 23, 2024

(54) PLANAR TRANSFORMER HAVING HEAT SINK

(71) Applicants: Hyundai Motor Company, Seoul (KR); Kia Motors Corporation, Seoul (KR)

(72) Inventor: Dae Woo Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 725 days.

(21) Appl. No.: 17/107,752

(22) Filed: Nov. 30, 2020

(65) Prior Publication Data

US 2022/0139605 A1 May 5, 2022

(30) Foreign Application Priority Data

Oct. 30, 2020 (KR) ........................ 10-2020-0143028

(51) Int. Cl.
*H01F 27/24* (2006.01)
*H01F 27/22* (2006.01)
*H01F 27/28* (2006.01)

(52) U.S. Cl.
CPC ............. *H01F 27/22* (2013.01); *H01F 27/24* (2013.01); *H01F 27/28* (2013.01); *H01F 2027/2819* (2013.01)

(58) Field of Classification Search
CPC .......... H01F 27/22; H01F 27/24; H01F 27/28; H01F 2027/2819; H01F 27/306; H01F 2027/2809; H01F 27/2804; H01F 27/2876; H01F 27/26; H01F 27/085; H01F 27/266
USPC ...................................................... 336/55–61
See application file for complete search history.

(56) References Cited

U.S. PATENT DOCUMENTS

| | | | | |
|---|---|---|---|---|
| 2011/0241816 | A1* | 10/2011 | Park | H01F 41/34 336/200 |
| 2016/0064134 | A1* | 3/2016 | Yeo | H01F 27/22 336/61 |
| 2016/0372250 | A1* | 12/2016 | Chida | H01F 30/10 |
| 2017/0237358 | A1 | 8/2017 | Kraus et al. | |
| 2018/0040410 | A1* | 2/2018 | Hamada | H05K 1/0262 |
| 2018/0047497 | A1* | 2/2018 | Miyakawa | H01F 17/06 |
| 2019/0019618 | A1* | 1/2019 | Fukui | H05K 1/165 |
| 2021/0185817 | A1* | 6/2021 | Fujii | H05K 7/209 |

FOREIGN PATENT DOCUMENTS

KR 10-2019-0072729 A 6/2019

* cited by examiner

*Primary Examiner* — Shawki S Ismail
*Assistant Examiner* — Kazi S Hossain
(74) *Attorney, Agent, or Firm* — MORGAN, LEWIS & BOCKIUS LLP

(57) ABSTRACT

A planar transformer may include a primary printed circuit board (PCB) having at least a hole in which a first core and a second core are inserted and including a coil pattern, a secondary PCB having at least a hole in which the first core and the second core are inserted and including a coil pattern, and a heat dissipation plate disposed between the primary PCB and the secondary PCB and including at least a hole in which the first core and the second core are inserted.

10 Claims, 4 Drawing Sheets

PLANAR TRANSFORMER HAVING HEAT SINK

CROSS-REFERENCE TO RELATED APPLICATION

The present application claims priority to Korean Patent Application No. 10-2020-0143028 filed on Oct. 30, 2020, the entire contents of which is incorporated herein for all purposes by this reference.

BACKGROUND OF THE INVENTION

Field of the Invention

The present invention relates to a transformer, and more particularly, to a planar transformer having a heat sink.

Description of Related Art

An environmentally friendly vehicle includes a high-voltage battery for driving a vehicle and a low-voltage battery for driving an electrical component. Electrical energy charged in the high voltage battery is used as a power source for a vehicle, and electrical energy charged in the low voltage battery is used as a power source for the electrical component of the vehicle.

The environmentally friendly vehicle may include circuits for power conversion and circuits for battery charging, and transformers are provided in the circuits in many cases. Recently, research into replacement of transformers with planar transformers to reduce cost and improve ease of manufacturing has been actively conducted.

The planar transformer may be configured by sequentially laminating a secondary printed circuit board (PCB) (a circuit board with a coil pattern forming a secondary winding), a primary PCB (a circuit board with a coil pattern forming a primary winding), a primary PCB, and a secondary PCB. The coil patterns formed on the primary PCB and the secondary PCB may be positioned on the same vertical line.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a planar transformer including a heat radiation plate for improving heat dissipation performance and having advantages of adjusting leakage inductance by adjusting a thickness of the heat dissipation plate.

Various aspects of the present invention are directed to providing a planar transformer including: a primary printed circuit board (PCB) having at least a hole in which a first core and a second core are inserted and including a coil pattern; a secondary PCB having at least a hole in which the first core and the second core are inserted and including a coil pattern; and a heat dissipation plate disposed between the primary PCB and the secondary PCB and including at least a hole in which the first core and the second core are inserted.

The planar transformer may further include: a heat sink disposed below the secondary PCB.

The first core may include a first upper core inserted into the at least a hole of the primary PCB, the at least a hole of the heat dissipation plate, and the at least a hole of the secondary PCB and a first lower core coupled to the first upper core, and the second core may include a second upper core inserted into the hole of the primary PCB, the at least a hole of the heat dissipation plate, and the at least a hole of the secondary PCB and a second lower core coupled to the second upper core.

Leakage inductance of the planar transformer may be adjusted by adjusting a thickness of the heat dissipation plate.

The leakage inductance of the planar transformer may be reduced when the thickness of the heat dissipation plate is reduced.

The heat dissipation plate may include a ceramic material.

Various aspects of the present invention are directed to providing a planar transformer including: a primary printed circuit board (PCB) having a hole in which a core is inserted and including a coil pattern; a secondary PCB having a hole in which the core is inserted and including a coil pattern; and a heat dissipation plate disposed between the primary PCB and the secondary PCB and including a hole in which the core is inserted.

The planar transformer may further include: a heat sink disposed below the core; a first support member disposed between the heat dissipation plate and the heat sink; and a second support member disposed between the secondary PCB and the heat sink.

Leakage inductance of the planar transformer may be adjusted by adjusting a thickness of the heat dissipation plate.

Leakage inductance of the planar transformer may be reduced when a thickness of the heat dissipation plate is reduced.

The heat dissipation plate may include a ceramic material.

According to various exemplary embodiments of the present invention, since the planar transformer includes the heat dissipation plate, rather than a heat dissipation molding solution and a case, and thus a weight and cost of the transformer may be reduced.

In various exemplary embodiments of the present invention, leakage inductance of the transformer may be adjusted by adjusting a thickness of the heat dissipation plate.

Also, in various exemplary embodiments of the present invention, since the PCB on which the coil (winding) pattern is formed has the winding (coil) of the transformer, a volume of the transformer may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
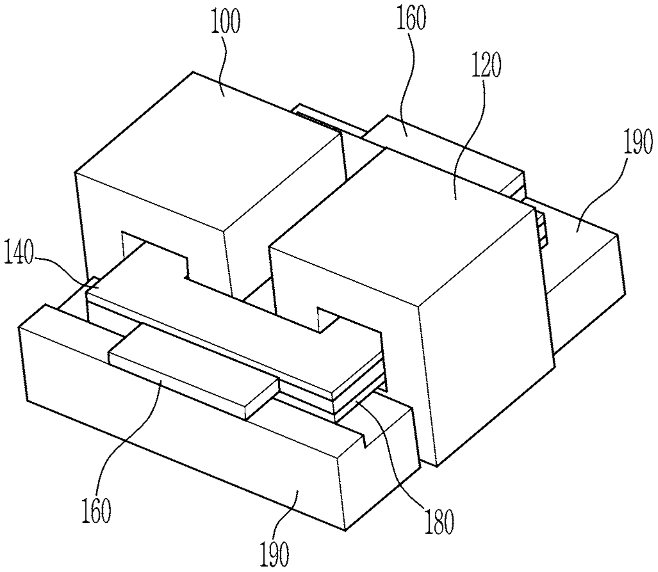
FIG. 1 is a perspective view exemplarily illustrating a planar transformer according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

To sufficiently understand the present invention and objects accomplished by executing the present invention, reference may be made to the accompanying drawings illustrating exemplary embodiments of the present invention and contents described in the accompanying drawings.

Hereinafter, the present invention will be described in detail by describing exemplary embodiments of the present invention with reference to the accompanying drawings. Furthermore, in describing the present invention, well-known configurations or functions will be omitted in detail since they may unnecessarily obscure the gist of the present invention. Throughout the drawings, the same reference numerals will denote the same components.

Terms used in the present embodiment are used only to describe specific exemplary embodiments rather than limiting the present invention. Singular forms are to include plural forms unless the context clearly indicates otherwise. It may be understood that the terms “include” or “have” used in the present embodiment specify the presence of features, numerals, steps, operations, components, parts mentioned in the present embodiment, or a combination thereof, but do not preclude the presence or addition of one or more other features, numerals, steps, operations, components, parts, or a combination thereof.

Throughout the present specification, when any one portion is referred to as being “connected to” another portion, it means that any one portion and another portion are “directly connected to” each other or are “electrically or mechanically connected to” each other with the other component interposed therebetween.

Unless being defined otherwise, the terms used in the present specification including technical and scientific terms have the same meanings as those that are generally understood by a person of ordinary skill in the art. It should be understood that the terms defined by the dictionary are identical with the meanings within the context of the related art, and they should not be ideally or excessively formally defined unless the context clearly dictates otherwise.

The transformer according to the related art includes a primary wire (or coil), a secondary wire, a core, a heat dissipation molding fluid, and a case.

The heat dissipation molding liquid and the case may dissipate heat generated inside the transformer. However, since the transformer includes the heat dissipation molding liquid and the case, a weight and cost of the transformer may increase. Since the primary and secondary wires are copper wires, a volume of the transformer may increase.

In the transformer, it may be difficult to control a gap (separation distance) between the primary wire and the secondary wire. Therefore, it may be difficult to design leakage inductance of the transformer.

Figure 2:
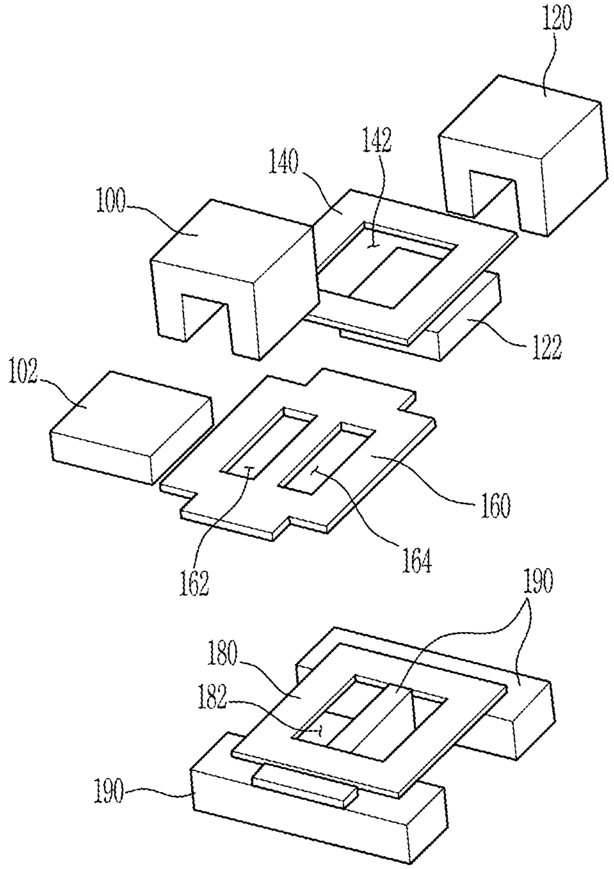
FIG. 2 is an exploded perspective view of the planar transformer shown in FIG. 1.
Figure 3:
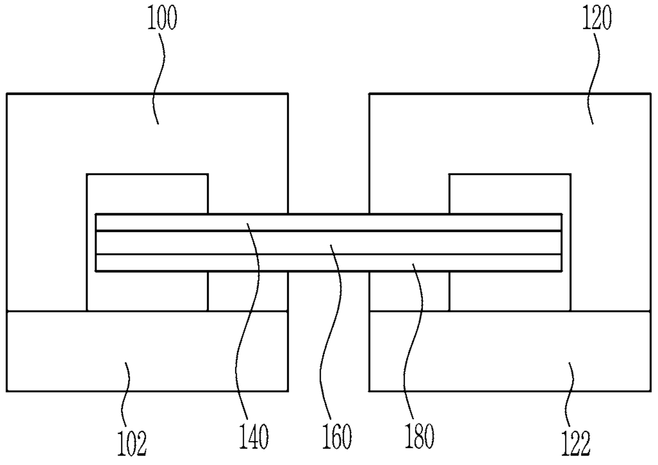
FIG. 3 is a front view of the planar transformer shown in FIG. 1.

FIG. 1 is a perspective view exemplarily illustrating a planar transformer according to various exemplary embodiments of the present invention. FIG. 2 is an exploded perspective view of the planar transformer shown in FIG. 1. FIG. 3 is a plan view of the planar transformer shown in FIG. 1.

Referring to FIG. 1, FIG. 2, and FIG. 3, the planar transformer may include a first core including a first upper core 100 and a first lower core 102, a second core including a second upper core 120 and a second lower core 122, a primary printed circuit board (PCB) 140, a heat dissipation plate 160, and a secondary PCB 180.

In another exemplary embodiment of the present invention, the planar transformer may further include a heat sink 190 disposed under the secondary PCB 180, absorbing heat from the planar transformer, and dissipating the heat to the outside.

For example, the planar transformer may be provided on a main board included in an on-board charger of the environmentally friendly vehicle including a hybrid vehicle.

The primary PCB 140 may correspond to a primary circuit of the planar transformer, have a hole 142 into which the first core and the second core are inserted, and include a coil pattern.

The secondary PCB 180 may correspond to a secondary circuit of a planar transformer, have a hole 182 into which a first core and a second core are inserted, and include a coil pattern.

The heat dissipation plate 160 may dissipate heat generated from the first core, the second core, the primary PCB 140, and the secondary PCB 180, and include at least one hole 162 or 164 disposed between the primary PCB 140 and the secondary PCB 180 and allowing the first core and the second core to be inserted therein.

For example, the heat dissipation plate 160 may include a ceramic material or an insulating material such as silicon.

The first core may include a first upper core 100 inserted into the hole of the primary PCB 140, the hole of the heat dissipation plate 160, and the hole of the secondary PCB 180 and a first lower core 102 coupled to the first upper core by a coupling member (e.g., an adhesive)

The first core may include a magnetic material.

The second core may include a second upper core 120 inserted into the hole of the primary PCB 140, the hole of the heat dissipation plate 160, and the hole of the secondary PCB 180 and a second lower core 122 coupled to the second upper core by a coupling member (e.g., an adhesive). The second core may include a magnetic material.

A thickness of the heat dissipation plate 160 may be adjusted so that leakage inductance of the planar transformer (e.g., leakage inductance between the primary PCB 140 and the secondary PCB 180) may be adjusted. When the thickness of the heat dissipation plate 160 is reduced, the leakage inductance of the planar transformer may be reduced, and when the thickness of the heat dissipation plate 160 is increased, leakage inductance of the planar transformer may be increased.

In an exemplary embodiment of the present invention, the heat sink 190 is in an "I" shape.

Figure 4:
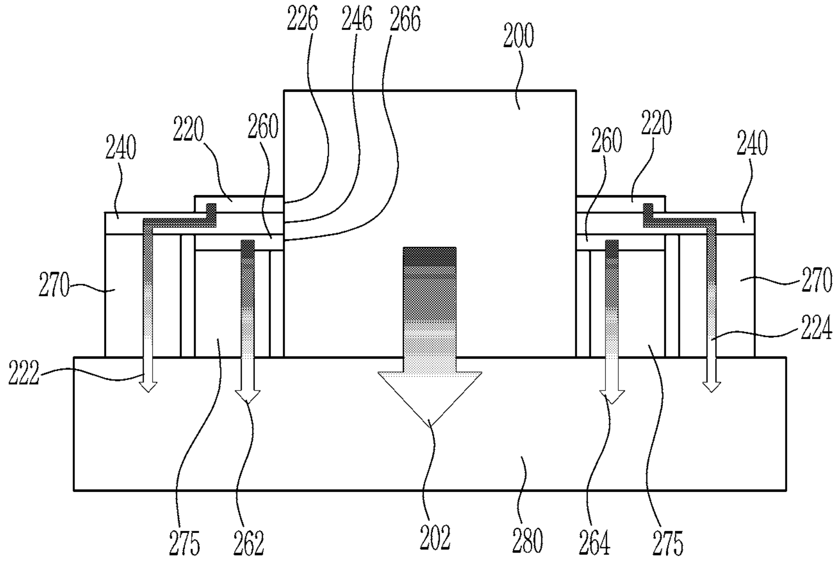
FIG. 4 is a vertical cross-sectional view exemplarily illustrating a planar transformer according to various exemplary embodiments of the present invention.

FIG. 4 is a vertical cross-sectional view exemplarily illustrating a planar transformer according to various exemplary embodiments of the present invention.

Referring to FIG. 4, the planar transformer may include a core 200, a primary PCB 220, a heat dissipation plate 240, and a secondary PCB 260.

In another exemplary embodiment of the present invention, the planar transformer may further include a heat sink 280 disposed under the core 200, absorbing heat from the planar transformer, and dissipating the heat to the outside, a first support member 270 disposed between the heat dissipation plate 240 and the heat sink 280, and a second support member 275 disposed between the secondary PCB 260 and the heat sink 280.

For example, the planar transformer may be provided on a main board included in an on-board charger of the environmentally friendly vehicle including a hybrid vehicle.

The primary PCB 220 may correspond to the primary circuit of the planar transformer, have a hole 226 into which the core 200 is inserted, and include a coil pattern.

The secondary PCB 260 may correspond to the secondary circuit of the planar transformer, have a hole 266 into which the core 200 is inserted, and include a coil pattern.

As shown in reference numerals 202, 222, 224, 262, and 264, the heat dissipation plate 240 may dissipate heat generated in the core 200, the primary PCB 220, and the secondary PCB 260 and may include a hole 246 disposed between the primary PCB 220 and the secondary PCB 260 and allowing the core 200 to be inserted therein.

For example, the heat dissipation plate 240 may include a ceramic material or an insulating material such as silicon.

For example, the core 200 may have a cylindrical shape and include a magnetic material.

The thickness of the heat dissipation plate 240 may be adjusted so that leakage inductance of the planar transformer (e.g., leakage inductance between the primary PCB 220 and the secondary PCB 260) may be adjusted. When a thickness of the heat dissipation plate 240 is reduced, the leakage inductance of the planar transformer is reduced, and when the thickness of the heat dissipation plate 240 is increased, the leakage inductance of the planar transformer may be increased.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A planar transformer comprising:

a primary printed circuit board (PCB) having at least a hole in which a first core and a second core are inserted and including a coil pattern;

a secondary PCB having at least a hole in which the first core and the second core are inserted and including a coil pattern; and a heat dissipation plate disposed between the primary PCB and the secondary PCB and including at least a hole in which the first core and the second core are inserted, wherein inner heights of the first core and the second core are larger than a sum of thicknesses of the primary PCB, the heat dissipation plate and the secondary PCB so that a leakage inductance of the planar transformer is adjusted by adjusting a thickness of the heat dissipation plate.

2. The planar transformer of claim 1, further including a heat sink disposed below the secondary PCB.

3. The planar transformer of claim 2, wherein the heat sink is in a shape of "I".

4. The planar transformer of claim 2, wherein the first core includes:

a first upper core inserted into the at least a hole of the primary PCB, the at least a hole of the heat dissipation plate, and the at least a hole of the secondary PCB, wherein the first upper core encloses first portions of the primary PCB, the heat dissipation plate and the secondary PCB; and a first lower core coupled to the first upper core to enclose the first portions of the primary PCB, the heat dissipation plate and the secondary PCB with the first upper core, and wherein the second core includes:

a second upper core inserted into the at least a hole of the primary PCB, the at least a hole of the heat dissipation plate, and the at least a hole of the secondary PCB, wherein the second upper core encloses second portions of the primary PCB, the heat dissipation plate and the secondary PCB; and a second lower core coupled to the second upper core to enclose the second portions of the primary PCB, the heat dissipation plate and the secondary PCB with the second upper core.

5. The planar transformer of claim 1, wherein the leakage inductance of the planar transformer is reduced when the thickness of the heat dissipation plate is reduced.

6. The planar transformer of claim 1, wherein the heat dissipation plate includes a ceramic material.

7. A planar transformer comprising:

a primary printed circuit board (PCB) having a hole in which a core is inserted and including a coil pattern;

a secondary PCB having a hole in which the core is inserted and including a coil pattern; and a heat dissipation plate disposed between the primary PCB and the secondary PCB and including a hole in which the core is inserted, wherein inner heights of a first core and a second core are larger than a sum of thicknesses of the primary PCB, the heat dissipation plate and the secondary PCB so that a leakage inductance of the planar transformer is adjusted by adjusting a thickness of the heat dissipation plate.

8. The planar transformer of claim 7, further including:

a heat sink disposed below the core;

a first support member disposed between the heat dissipation plate and the heat sink; and a second support member disposed between the secondary PCB and the heat sink.

9. The planar transformer of claim 7, wherein the leakage inductance of the planar transformer is reduced when the thickness of the heat dissipation plate is reduced.

10. The planar transformer of claim 7, wherein the heat dissipation plate includes a ceramic material.

* * * * *